April 22, 1952     A. G. GETZ     2,594,008
CELLULAR CORE FOR HEAT EXCHANGE UNITS Filed Feb. 7, 1950     5 Sheets-Sheet 1

INVENTOR.
Arnstead G. Getz
BY
Brown, Jackson, Boettcher + Dienner,
Attys.

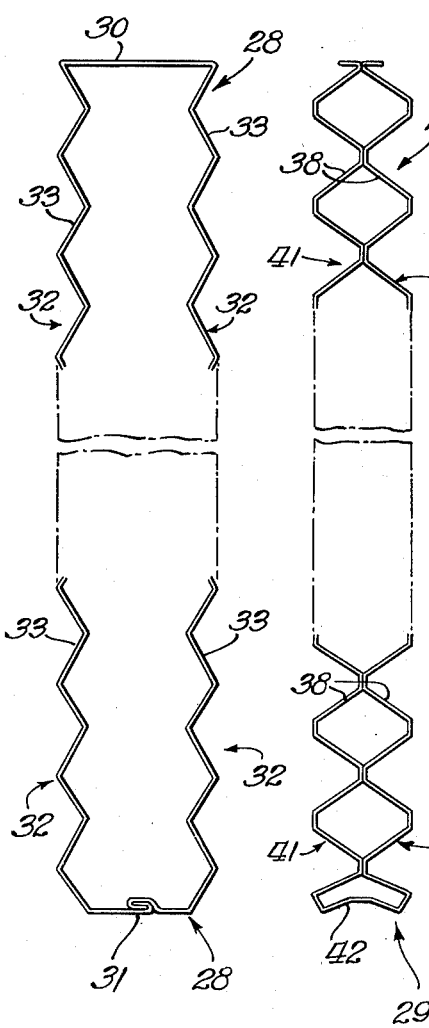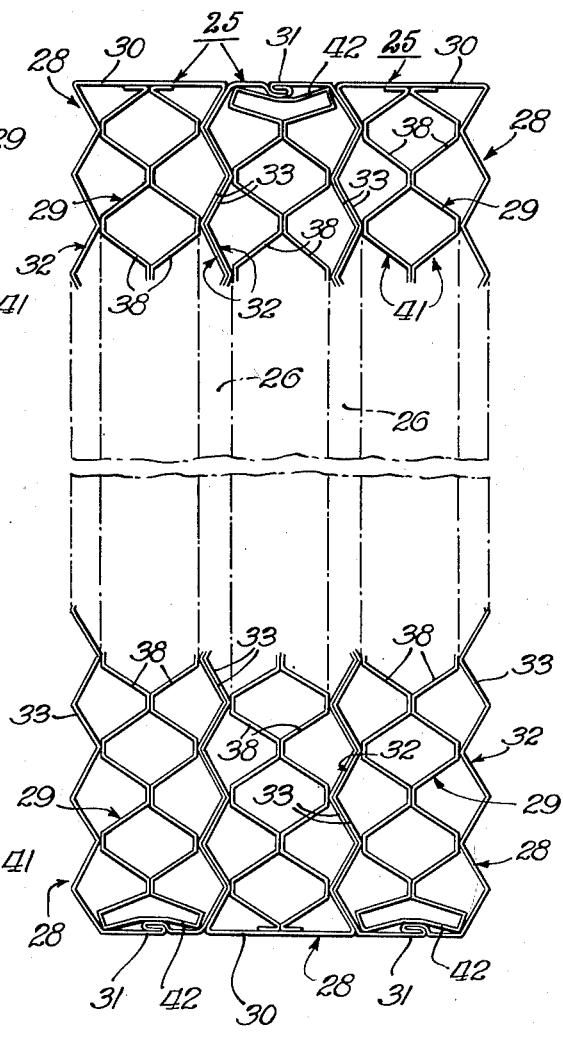

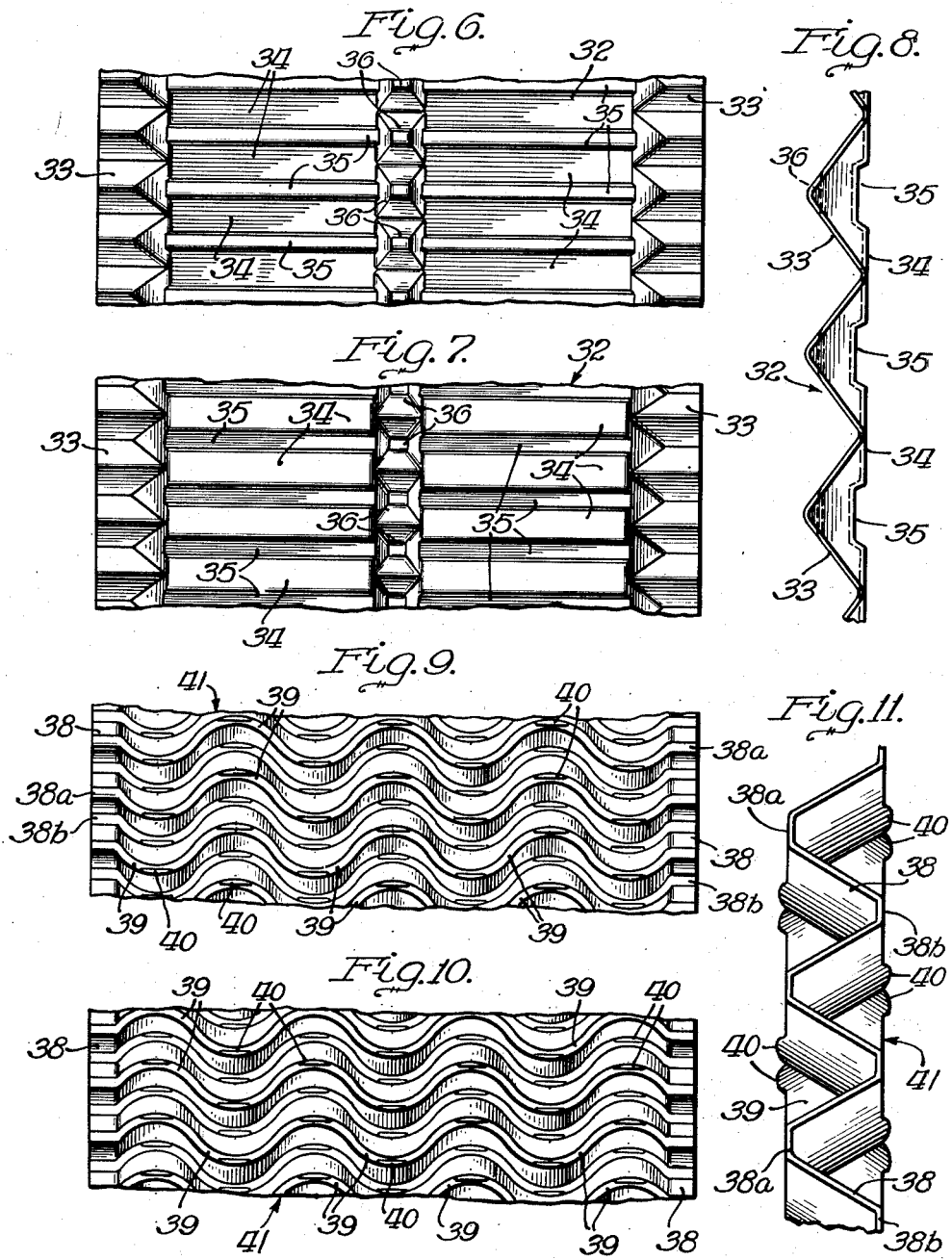

April 22, 1952 A. G. GETZ 2,594,008
CELLULAR CORE FOR HEAT EXCHANGE UNITS
Filed Feb. 7, 1950 5 Sheets-Sheet 4
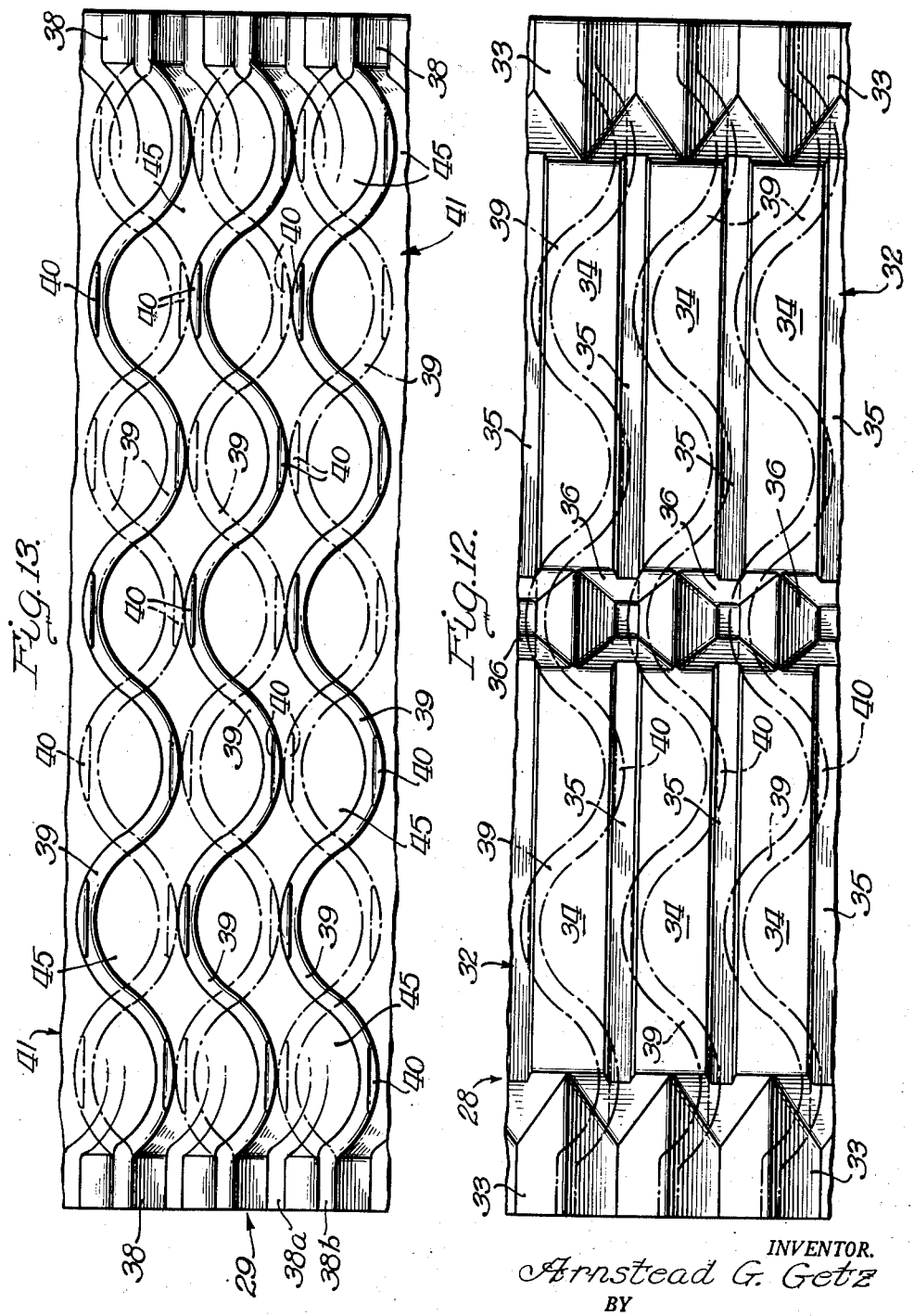
INVENTOR.
Arnstead G. Getz
BY
Brown, Jackson, Boettcher & Dienner
Attys.

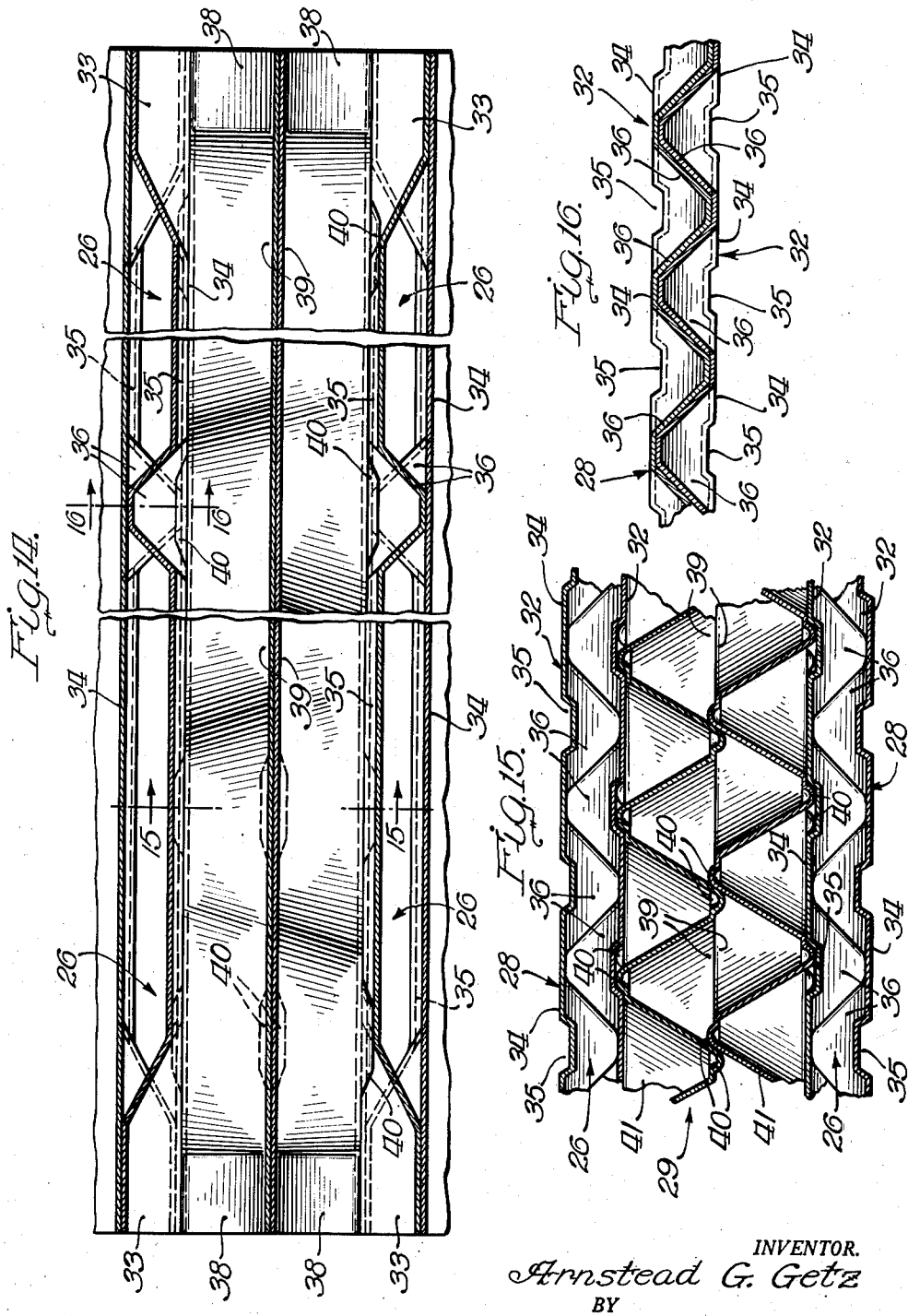

Patented Apr. 22, 1952

2,594,008

UNITED STATES PATENT OFFICE 2,594,008

CELLULAR CORE FOR HEAT EXCHANGE UNITS

Arnstead G. Getz, Lakewood, Ohio, assignor to The Bishop & Babcock Manufacturing Company, Cleveland, Ohio, a corporation of Ohio Application February 7, 1950, Serial No. 142,796

6 Claims. (Cl. 257—130)

This invention relates to cores for heat exchange units such as automobile radiators and heaters, and has to do with cellular cores fabricated from sheet metal strips secured together at their front and back margins and defining water passages and air passages between the water passages.

Cores of the character stated are known and extensively used. In all of such cores with which I am familiar, the air passages are so constructed that the air passing therethrough has, in considerable portion, free flow from front to back of the core. That results in columns of air flowing through the respective air passages without contacting the walls thereof and of the water passages for abstracting heat therefrom, so that the heat exchange capacity of the known cellular cores referred to is rather low. Accordingly, the total amount of metal in such a heat exchange core, in order to attain a given total heat exchange capacity, is rather large, which is reflected in the cost of production.

My invention is directed to a heat exchange core of cellular construction which avoids the above noted objections to the known cores. I have discovered that by constructing the air passages so as to have intimate metal to metal contact of the separators with the walls of the water passages for substantially their full extent from front to back and produce high turbulence of the air passing therethrough, effective to assure heat exchange contact of all of such air with the walls of the air passages and the walls of the water passages, the heat exchange efficiency of the core can be materially increased. That renders possible a substantial saving in metal in a core of a given heat exchange capacity with a corresponding saving in cost of production. The core of my invention comprises a plurality of units or sections assembled to provide water passages between them, each section having two water walls and a separator therebetween provided with transverse sinuous or undulatory ribs seating on the water walls in metal to metal contact and defining therewith tortuous air passages extending from front to back of the core. The separators preferably are formed of two opposed sheet metal strips corrugated transversely to provide sinuous ribs, and disposed with the ribs at the opposed inner faces of the strips in seating contact and defining therebetween tortuous air passages extending from front to back of the core, additional to the air passages between the separator and the water walls. The separator is preferably formed from a single length of sheet metal folded transversely to provide two parallel strips or arms, the ribs of one being reversed relative to the ribs of the other. That provides air passages extending from front to back of the core, between the arms of the separator, and tortuous horizontally as well as vertically, which is conducive to high turbulence of the air and intimate heat exchange contact thereof with the water walls and the strips of the separator. The water walls and the separators of the respective sections are provided with cooperating elements for accurately positioning them in proper assembled relation, and the water walls of the respective sections are further provided with cooperating elements for holding them in proper relation one to the other; which is conducive to expedition and facility in assembling and securing together the units of the core. Further objects and advantages of my invention will appear from the detail description.

In the drawings:

Figure 3 is a front view, on an enlarged scale relative to Figure 1, of one of the water wall members of one of the units of the core;

Figure 4 is a front view, on the same scale as Figure 3, of one of the separators;

Figure 5 is a front view of three units of the core disposed in assembled relation, on the same scale as Figure 4, partly broken away and in section;

Figure 6 is a fragmentary inner face view of one of the water walls, on an enlarged scale relative to Figure 3;

Figure 7 is a fragmentary outer face view of the water wall of Figure 6;

Figure 8 is a fragmentary edge view of the water wall of Figures 6 and 7;

Figure 9 is a fragmentary outer face view, on the same scale as Figure 7, of one of the arms or strips of a separator of one of the core units;

Figure 10 is a view similar to Figure 9, but of the inner face of one of the arms or strips of a separator;

Figure 11 is a fragmentary front edge view of the separator arm or strip of Figure 9, on an enlarged scale;

Figure 12 is a fragmentary outer face view, on an enlarged scale relative to Figure 7, of one of the water walls of one of the core units, showing in dot and dash lines several of the sinuous ribs of the adjacent arm or strip of the associated separator and how the ribs are positioned upon the wider transverse ribs of the water wall by the positioning and guide elements of the separator ribs;

Figure 13 is a fragmentary inner face view, on an enlarged scale relative to Figure 10, of one of the separator arms or strips with the sinuous ribs of the other and opposed arm or strip indicated in dot and dash lines;

Figure 14 is a sectional view, partly broken away, taken substantially on line 14—14 of Figure 2, but with the separator shown in section along the median lines of the inwardly extending undulatory ribs thereof;

Figure 15 is a sectional view of one of the separators taken substantially on line 15—15 of Figure 14; and Figure 16 is a sectional view of one of the water passages and its enclosing walls, taken substantially on line 16—16 of Figure 14.

Figure 1:
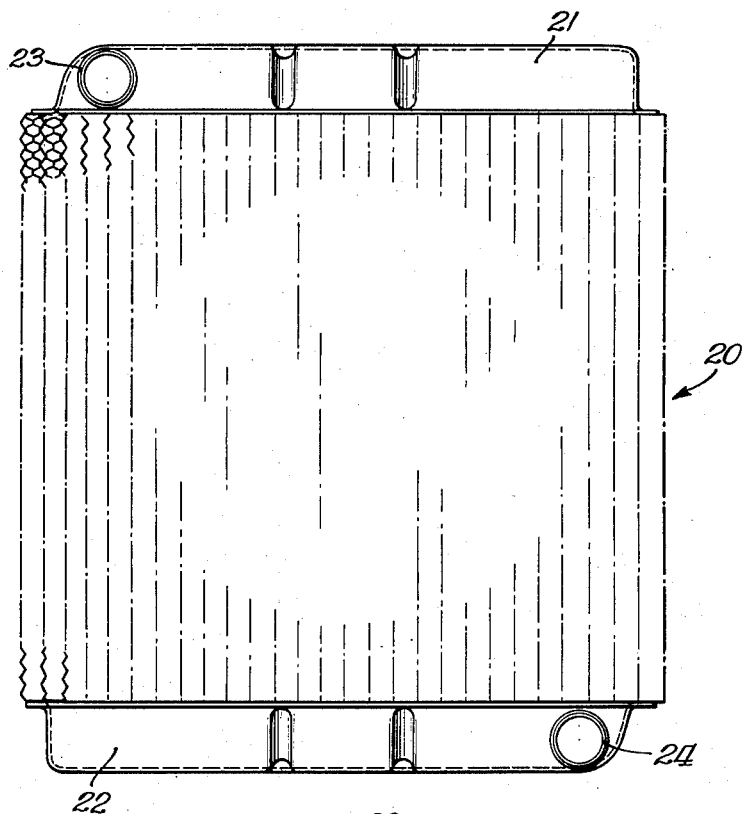
Figure 1 is a front view of a heat exchange unit cellular core embodying my invention.

In Figure 1 I have shown a cellular core 20 embodying my invention, which is intended for use in an automobile heater, though similar cores are suitable for use in radiators. This core 20 is provided with flanged top and bottom tanks 21 and 22, respectively, suitably secured thereto, conveniently by soldering, these tanks opening into the vertical water passages of the core and being respectively provided with inlet and outlet nipples 23 and 24. The core 20 is formed of a suitable number of the units 25 suitably assembled and secured together defining between them vertical water passages 26 extending from the top to the bottom of the core, as shown in Figure 5.

Each of the units 25 comprises a water wall member 28 and a separator 29 therein. The water wall member 28 is formed from a strip of brass of thin gage which is flattened transversely at its mid-length, at 30, and folded over on itself, the two ends of the strip being secured together by a lock seam 31. The member 28 thus produced is of elongated rectangular or oblong shape as viewed from in front, as in Figure 3. The front and rear portions of the arms or water walls 32 are corrugated at 33 and are slightly offset inwardly relative to the water passages 26, as will appear fully later. Each of the water walls 32 is provided with relatively wide transverse ribs 34 projecting a slight distance outward therefrom relative to the water passage 26 and alternating with relatively narrow transverse ribs 35, as shown more clearly in Figures 6 and 7, extending inward of wall 32 relative to the water passage 26. The ribs 34 and 35 are centered relative to the corrugations 33 and extend therefrom to the mid-portion of wall 32, to frusto-pyramidal projections 36 pressed from water wall 32 and extending therefrom inward of the water passage 26.

The separator 29 is formed from a strip of copper of light gage, of the same width as the brass strip from which the water wall member 28 is formed, the copper separator strip having its front and back edge portions provided with narrow corrugations 38 straight transversely of the strip and having flattened crests. The separator strip is further corrugated to provide, at each face thereof, transversely extending sinuous ribs 39 of substantially V shape in cross section, the crests of which are flattened and extend between and connect the crests of alined corrugations 38 at the edges of the strip. The ribs 39 are provided, at the crests thereof, with guide and positioning elements 40 of relatively slight height pressed therefrom. The vertical distance between any two successive elements 40 is the same as the vertical extent or width of the wider ribs 34 of the water walls 32. The corrugated copper separator strip is flattened transversely at its mid-length and is folded over on itself to provide the separator 29, comprising the two parallel strips or arms 41 connected at one end by the flat element 42 and free from each other at their other ends.

The separator 29 is of elongated rectangular or oblong shape in front view and is of proper width to fit snugly within the water wall member 28, with the ribs 39 at the inner faces of arms 41 seating on each other, the ribs 39 at the outer faces of arms 41 seating upon the wider transverse ribs 34 at the outer faces, relative to the water passage 26, of the water walls 32, with the positioning and guide elements 40 of each rib 39 engaging the upper and lower edges of ribs 34, as in Figure 12. The elements 40 thus cooperates with ribs 34 of the water walls 32 for accurately positioning the arms 41 of the separator 29 relative to each other and to the water walls 32, with the flat crests of the sinuous ribs 39 seating, for substantially their full length, upon ribs 34 in metal to metal contact therewith. As will be understood from what has been said, the ribs 39 at the inner faces of arms 41 of the separator 29 are reversed, that is, the ribs 39 of one arm 41 are reversed relative to the ribs 39 of the other arm 41; the ribs of one arm seating on the ribs of the opposed arm.

Figure 2:
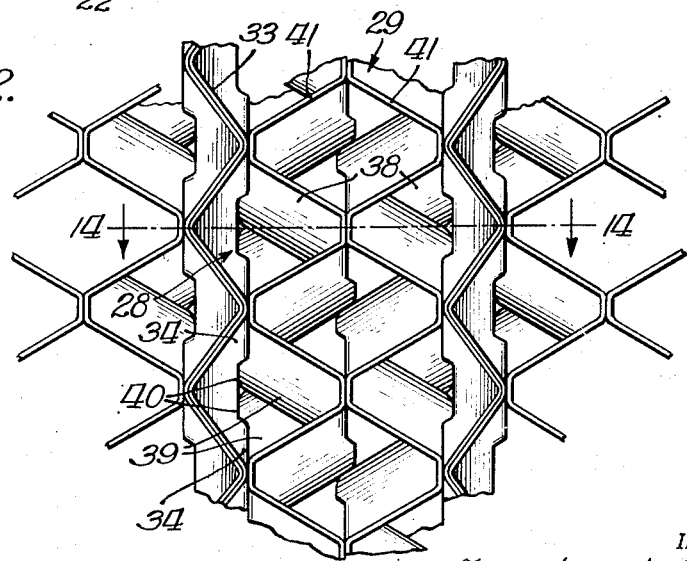
Figure 2 is a fragmentary front view, on an enlarged scale, of the core of Figure 1.

The separator 29, formed in the manner stated, is inserted into the water wall 28 from front to back thereof, with the sinuous ribs 39 at the outer faces of arms 41 straddling and seating upon ribs 34 of water walls 32, elements 40 cooperating with ribs 34 for guiding and positioning the parts during such insertion of separator 29. In the fully inserted position of separator 29 the front and back edges thereof are flush with the front and back edges of the water wall member 28, the flattened crests 38a of the corrugations 38 extending outwardly of arms 41 of separator 29 seat upon the crests of the opposed corrugations 33 of the water walls 32, and the flattened crests 38b of the opposed inwardly extending corrugations 38 of arms 41 of the separator 29 seat upon each other; as shown in Figure 2. Since the sinuous ribs 39 at the inner faces of arms 41 of separator 29 are reversed, the bends or undulations of the opposed ribs cross each other providing between them openings 45 establishing communication between the sinuous channels at opposite sides of each of said ribs, provided by the ribs at the outer faces of arms 41 of separator 29. The crests or undulations of the ribs 39 overlap, as is shown more clearly in Figures 9 and 10, providing between the ribs 39 tortuous air passages each having a plurality of oppositely directed bends. The corrugations at the front and back edge margins of arms 41 of separator 29 define a vertical series of diamond shaped openings for inlet and exit of cooling air to and from the tortuous passages between the ribs 39, and the corrugations 33 of the water walls 32 define, with the corrugations 38 of arms 41 of separator 29, two vertical series of air inlet openings, at the front of the unit, and two vertical series of openings of approximately diamond shape at the back of the unit, between arms 41 of separator 29 and water walls 32, these openings communicating with tortuous passages between the ribs 39 at the outer faces of arms 41 of separator 29. Cooling air flowing through the passages between the arms 41 of separator 29 and the water walls 32 is forced to flow through a tortuous path effective for imparting high turbulence to such air and bringing it into intimate heat exchange contact with the water walls and with ribs 39 of arms 41 of separator 29. Likewise, air flowing between arms 41 of separator 29 is forced to flow through tortuous passages in a vertical direction and also, due to the crossing of the ribs 39 and the resultant opening 45, flows through tortuous paths horizontally or transversely of the unit comprising the water wall member and the separator. In that manner, air flowing through the unit is brought into intimate heat exchange contact with the metal walls thereof, thereby assuring high heat exchange efficiency of the unit. Additionally, the ribs 39 at the outer faces of arms 41 of the separator 29 have large area of metal to metal contact with the water walls 32, and the ribs 39 and the corrugations 38 also have large area of contact at the inner faces of arms 41; assuring a high rate of heat transfer from the water flowing through the water passages, to be explained more fully presently, and the air cooled parts of the structure.

In constructing the core of Figure 1, a suitable number of units, each comprising a water wall member and a separator therein, are assembled in side to side relation, with the marginal corrugations 33 of each water wall 32 nesting in the marginal corrugations of the next adjacent water wall and, in cooperation therewith, positioning the units accurately in proper relation while spacing the adjacent water walls 32 apart providing therebetween the water passages 26; as in Figure 5. The block of assembled units is then clamped together in a suitable frame, with the tanks 21 and 22 clamped on the top and the bottom of the block and opening to the water passages 26. The entire assembly is then dipped, first the front and then the back, in a suitable flux or acid solution, after which the assembly is dipped, first the front and then the back, in molten solder, thus soldering together the water walls and the separators so as to produce, as a unitary structure, the core 20. In this dip soldering operation, the solder flows by capillarity between the sinuous ribs 39 at the outer faces of arms 41 of the separators 20 and the relatively wide ribs 34 at the outer faces of the water walls 32, which are thus secured together in metal to metal contact, conducive to high rate of heat flow from the water walls to the separators. Referring more particularly to Figures 14 and 16, when the units are assembled in the manner stated, the projections 36 at the inner face of the respective water walls 32 mesh with the projections 36 at the inner face of the next adjacent water wall 32 and preferably close the spaces between such projections. In that manner, each of the water passages 26 is separated into a front portion or channel and a rear portion or channel, whereby the water is divided in two downwardly flowing parallel columns, the projections 36 assisting in transfer of heat from the water to the metal of the water wall 32 and thence to the cooling air flowing through the air passages. In the dip soldering operation the front and the back flanges of the tanks 21 and 22 are soldered to the top and the bottom of the core 20, as will be understood. The side flanges of the tanks may be soldered to the top and the bottom of the core in a suitable manner, conveniently by dip soldering. The completely assembled and soldered core, including the tanks 21 and 22, after being inspected and tested, is provided with a protective coating, conveniently by dipping in a suitable coating material. In the completed core the sinuous air passages are of considerable length, as are the sinuous ribs defining, in whole or in part, such passages, so that the air flows through paths of considerable length and is brought into intimate contact with large areas of metal, which is conducive to high efficiency in effecting rapid abstraction of heat from the metal by the cooling air. Additionally, the cooling air is subjected to high turbulence, which further contributes to the heat exchange capacity of the core, which is supplemented by the tortuous flow horizontally, as well as vertically, of the cooling air passing between the arms 41 of the respective separators 29. The ribs 34 of the water walls 32 have a depth of but .015″ so that the space between the crests of ribs 39, at the outer faces of arms 41 of separator 29, and ribs 35 of water walls 32 is so restricted as to prevent free flow of air therethrough. In general, any air tending to flow through such spaces will partake of the turbulence of the air flowing between the sinuous ribs 39. Also, any slight amount of air which may flow between ribs 39 and the narrow ribs 35 of the water walls 32 will be in the form of a thin film and will have intimate contact with ribs 34 and 35, conducive to rapid abstraction of heat therefrom contributing to increased heat exchange efficiency of the core.

It will be understood that variations in detail may be resorted to without departing from the field and scope of my invention, and I intend to include all such variations, as fall within the scope of the appended claims, in this application in which the preferred form only of my invention has been disclosed.

I claim:

1. In a cellular core for heat exchange units, a plurality of sections each comprising two spaced apart substantially parallel and adjacent sheet metal water walls and a sheet metal spacer therebetween parallel therewith, said water walls having spaced transverse ribs of substantially uniform width projecting therefrom inwardly of said section, the water walls of adjacent sections having their front and back marginal portions secured together and being spaced apart therebetween providing water passages between the water walls of adjacent sections, said spacer having undulatory corrugations extending from front to back thereof providing undulatory ribs of curvilinear formation throughout their length with the undulations thereof merging smoothly into each other, said spacer ribs spanning the space between said two adjacent water walls and respectively seating on said transverse ribs thereof, said spacer ribs having outwardly projecting positioning elements at the outer sides of the undulations thereof straddling the respective water wall ribs restraining said spacer ribs against displacement therefrom, said spacer ribs defining in cooperation with said water walls continuous undulatory air passages extending from front to back of said section.

2. In a cellular core for heat exchange units, a plurality of sections each comprising two spaced apart substantially parallel and adjacent sheet metal water walls, and a sheet metal spacer between said water walls substantially parallel therewith, said water walls having spaced transverse ribs of substantially uniform width and height projecting therefrom inwardly of said section, the water walls of adjacent sections having their front and back marginal portions secured together and being spaced apart therebetween providing water passages between the water walls of adjacent sections, said spacer having undulatory corrugations extending from front to back thereof providing undulatory ribs of curvilinear formation throughout their length with the undulations thereof merging smoothly into each other, said spacer ribs spanning the space between said two adjacent water walls and respectively seating on said transverse ribs thereof, said spacer ribs having outwardly projecting positioning elements at the outer sides of the undulations thereof straddling the respective water wall ribs restraining said spacer ribs against displacement therefrom, said spacer ribs defining in cooperation with said water walls continuous undulatory air passages extending from front to back of said section.

3. In a cellular core for heat exchange units, a plurality of sections each comprising two spaced apart substantially parallel and adjacent sheet metal water walls, and a sheet metal spacer between said water walls substantially parallel therewith, said water walls having spaced transverse ribs of substantially uniform width and height projecting therefrom inwardly of said section and having flat crests of appreciable width, the water walls of adjacent sections having their front and back marginal portions secured together and being spaced apart therebetween providing water passages between the water walls of adjacent sections, said spacer having undulatory corrugations extending from front to back thereof providing undulatory ribs of curvilinear formation throughout their length with the undulations thereof merging smoothly into each other, said spacer ribs spanning the space between said two adjacent water walls and having flat crests of appreciable width respectively seating on said transverse ribs thereof, said spacer ribs having outwardly projecting positioning elements at the outer sides of the undulations thereof straddling the respective water wall ribs restraining said spacer ribs against displacement therefrom, said spacer ribs defining in cooperation with said water walls continuous undulatory air passages extending from front to back of said section.

4. In a cellular core for heat exchange units, a plurality of sections each comprising two spaced apart substantially parallel and adjacent sheet metal water walls, and a sheet metal spacer between said water walls substantially parallel therewith, said water walls having spaced transverse ribs projecting therefrom inwardly of said section and having flat crests of appreciable width, the water walls of adjacent sections having their front and back marginal portions secured together and being spaced apart therebetween providing water passages between the water walls of adjacent sections, said spacer having undulatory corrugations extending from front to back thereof providing undulatory ribs of curvilinear formation throughout their length with the undulations thereof merging smoothly into each other, said spacer ribs spanning the space between said two adjacent water walls and having flat crests of appreciable width respectively seating on said transverse ribs thereof, said spacer ribs having outwardly projecting positioning elements at the outer sides of the undulations thereof straddling the respective water wall ribs restraining said spacer ribs against displacement therefrom, said spacer ribs defining in cooperation with said water walls continuous undulatory air passages extending from front to back of said section.

5. In a cellular core for heat exchange units, a plurality of sections each comprising two spaced apart substantially parallel and adjacent sheet metal water walls, and a sheet metal spacer between said water walls substantially parallel therewith, said water walls having spaced transverse ribs of substantially uniform width and height, each of said ribs having a flat surface of appreciable width, the water walls of adjacent sections having their front and back marginal portions secured together and being spaced apart therebetween providing water passages between the water walls of adjacent sections, said spacer having undulatory corrugations extending from front to back thereof providing undulatory ribs of curvilinear formation throughout their length with the undulations thereof merging smoothly into each other, said spacer ribs spanning the space between said two adjacent water walls and having flat crests of appreciable width respectively seating for substantially their full length on said flat surfaces of said water wall ribs in metal to metal contact therewith, said water wall ribs and said spacer ribs having interengaging relation effective for restraining said spacer ribs against displacement from said water wall ribs, said spacer ribs defining in cooperation with said water walls undulatory air passages extending from front to back of said section.

6. In a cellular core for heat exchange units, a plurality of sections each comprising two spaced apart substantially parallel and adjacent sheet metal water walls and a sheet metal spacer therebetween substantially parallel therewith, said water walls having spaced transverse ribs each provided with a flat surface of appreciable width, the water walls of adjacent sections having their front and back marginal portions secured together and being spaced apart therebetween providing water passages between the water walls of adjacent sections, said spacer having undulatory corrugations extending from front to back thereof providing undulatory ribs of curvilinear formation throughout their length with the undulations thereof seating for substantially their full length upon said flat surfaces of said water wall ribs in metal to metal contact therewith and spanning the space between said two adjacent water walls and defining in cooperation therewith undulatory air passages extending from front to back of said section, said spacer ribs having interengaging relation with said water wall ribs effective for restraining said spacer ribs against displacement from said water wall ribs.

ARNSTEAD G. GETZ.

REFERENCES CITED

The following references are of record in the file of this patent:

UNITED STATES PATENTS

| Number | Name | Date |
|---|---|---|
| 1,606,643 | Kramer et al. | Nov. 9, 1926 |
| 1,635,656 | Beyer | July 12, 1927 |
| 2,020,957 | Oppe et al. | Nov. 12, 1935 |